United States Patent [19]
Wilhelms

[11] Patent Number: 5,282,092
[45] Date of Patent: Jan. 25, 1994

[54] VIDEO AND/OR AUDIO SIGNAL RECEIVING AND RECORDING ARRANGEMENT

[76] Inventor: Rolf E. Wilhelms, Preysingstrasse 11, 8000 Munich 80, Fed. Rep. of Germany

[21] Appl. No.: 647,653

[22] Filed: Jan. 30, 1991

[30] Foreign Application Priority Data

Jan. 30, 1990 [DE] Fed. Rep. of Germany ....... 4002646

[51] Int. Cl.$^5$ ............................ G11B 5/00; G11B 15/12
[52] U.S. Cl. ........................................... 360/5; 360/61
[58] Field of Search ............................ 360/5, 7, 69, 61; 358/908; 369/7

[56] References Cited

U.S. PATENT DOCUMENTS

| | | | |
|---|---|---|---|
| 3,812,530 | 5/1974 | Ikegami | 360/5 |
| 4,197,497 | 7/1980 | Phelps | 360/5 |
| 4,282,606 | 8/1981 | Factor | 455/620 |
| 4,408,309 | 10/1983 | Kiesling et al. | 369/7 |
| 4,531,161 | 7/1985 | Murakoshi | 360/5 |
| 4,982,390 | 1/1991 | Tanaka | 360/7 |
| 5,025,324 | 6/1991 | Hashimoto | 360/5 |

FOREIGN PATENT DOCUMENTS

| | | |
|---|---|---|
| 2219330 | 11/1973 | Fed. Rep. of Germany . |
| 3015737 | 11/1980 | Fed. Rep. of Germany . |
| 3126430 | 3/1982 | Fed. Rep. of Germany . |
| 3333078 | 3/1985 | Fed. Rep. of Germany . |
| 3528643 | 2/1987 | Fed. Rep. of Germany . |
| 8810090 | 2/1989 | Fed. Rep. of Germany . |
| 01838 | 2/1990 | PCT Int'l Appl. . |

OTHER PUBLICATIONS

Funkschau 1960/Heft 22: Mirastar S 15 ein Plattenspieier für junge Leute (Scallplatte und Tonband).

*Primary Examiner*—Donald Hajec
*Assistant Examiner*—Won Tae C. Kim
*Attorney, Agent, or Firm*—Sixbey, Friedman, Leedom & Ferguson

[57] ABSTRACT

A device or arrangement for recording video and/or audio data with at least one receiving and recording device and a connected or integrated additional audio and/or video data storage means of limited capacity, of 2 to 10 minutes, preferably 3.5 to 6.5 minutes which, when the receiving device is set in operation, commences storage of the data received and stores it in the same sequence as reception and for the storage period corresponding to the limited storage capacity and then in the sequence in which it is stored erases it or disposes of it and accordingly fills up the storage space with the continuously received data and upon commencement of the per se known storage on per se known storage material (recording tape cassettes, video cassettes) either stops or continuously transfers the received data for recording purposes, with a time lag corresponding to the limited capacity of the interim storage means, to the per se known recording carrier.

14 Claims, 1 Drawing Sheet

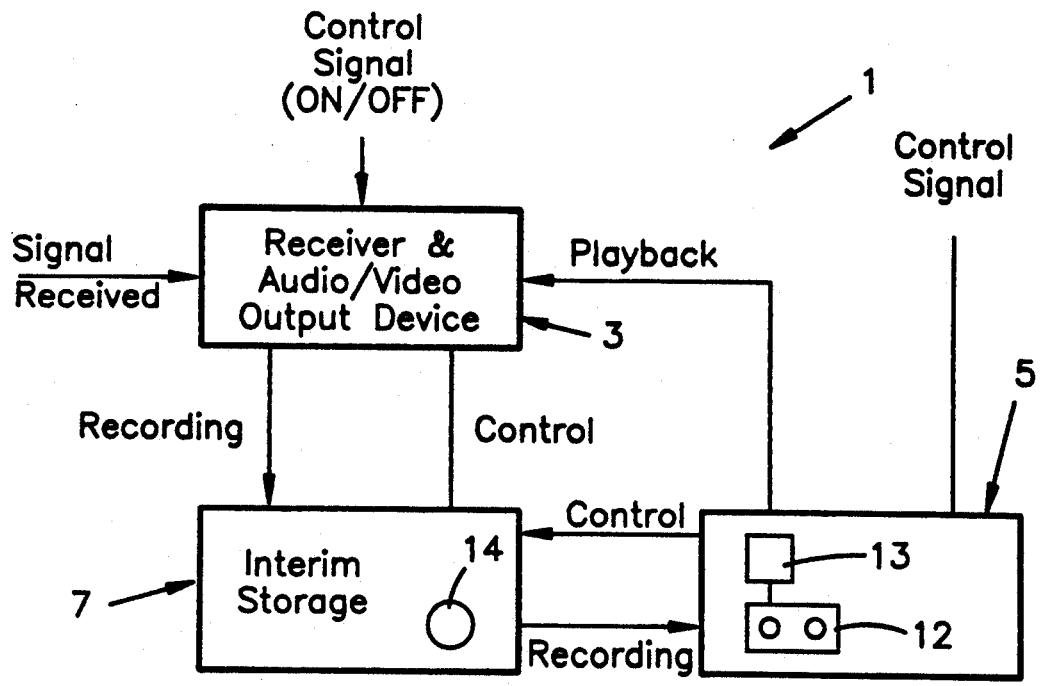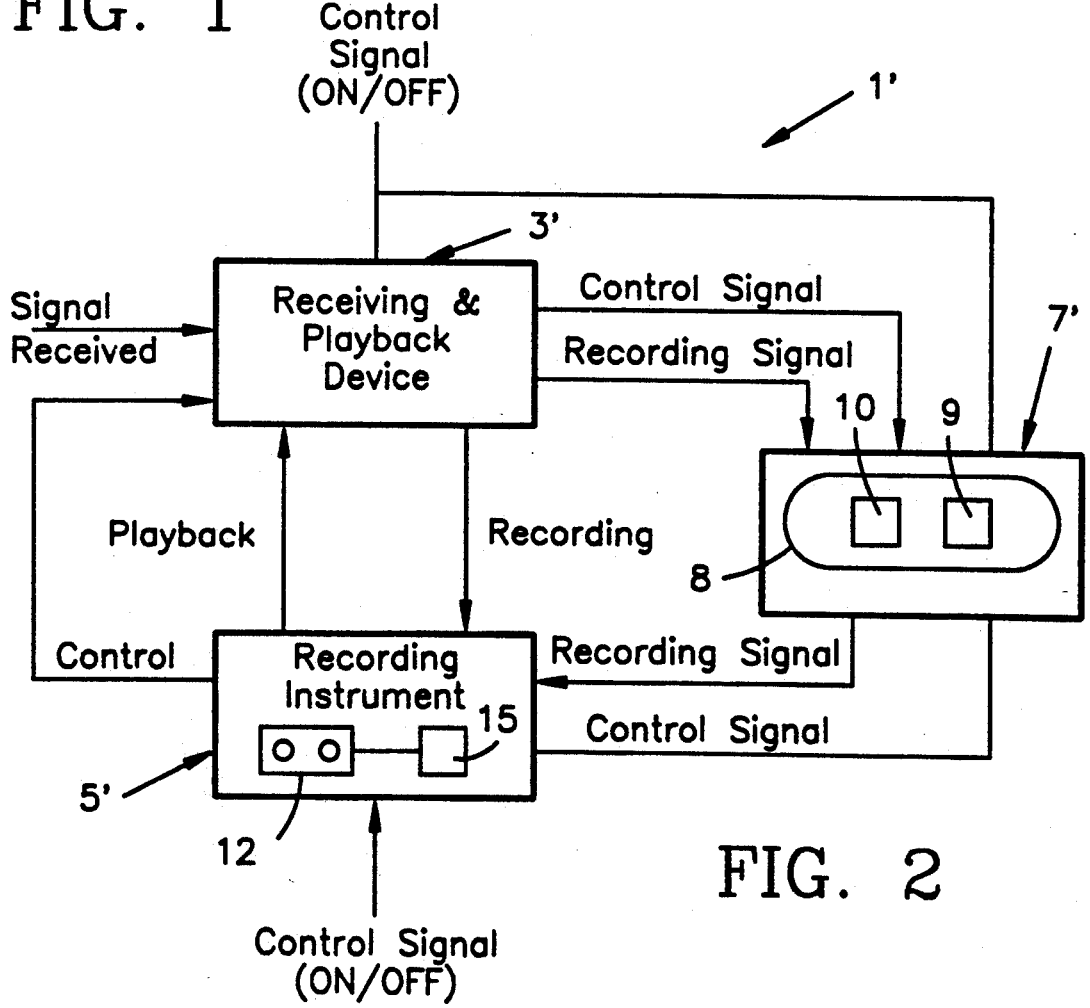

VIDEO AND/OR AUDIO SIGNAL RECEIVING AND RECORDING ARRANGEMENT

BACKGROUND OF THE INVENTION

The invention relates to a video and/or audio signal receiving and recording arrangement comprising a receiver and a recording apparatus.

Such arrangements are known for example as video recorders with integrated playback device (monitor) or a separate television set. In another technical field, they are known as radio cassette recorders with an integrated radio receiver part.

Known from German Offenlegungsechrift 31 26 430 is a recording instrument, for example a dictating instrument, with an automatic starting device which switches on the dictating instrument and in particular the drive for the recording carrier when the amplitude of the signal to be recorded is above a response threshold. This construction avoids unnecessary tape use since the instrument works only when an effective signal is present.

With such a recording instrument, in order to avoid the commencement being recorded in a distorted fashion after the recording has started, since the recording instrument has as yet failed to reach the necessary running speed of the recording carrier, a delay part is provided which delays the recording of the signal on the recording carrier by a period of time which corresponds to the time which the recording carrier needs to reach its desired speed.

It is possible furthermore to ascertain from the magazine Funkschau 1960, No. 22, pp. 559 to 561, in the case of a magnetic tape recorder with an automatic starting facility which only begins to run when there is a signal to be recorded, to delay the recording signal by a few seconds, for example by using an endless auxiliary tape, in order to lose as little signal as possible at the start.

It is known from U.S. Pat. No. 4,282,606 in the case of live radio transmissions to delay the original signal by a certain period of time prior to transmission so that there is a possibility of monitoring the transmission and possibly of suppressing undesired passages without the receiver being aware of the fact.

Finally, radios or television sets are known in which, during transmission, the listener/viewer is able to replay a few seconds of the previously received transmission. Upon termination of this replay, the playback of the original transmission is resumed again at this point in time, in which case the part of the original transmission which continued to run during the replay is lost. A recording according to the invention is in this case neither intended nor possible.

Audio and/or video recordings of a live programme are usually made in that the receiver is switched on, the transmission channel or frequency which is of interest is located and the recording is commenced at a moment when the viewer or the listener passes the appropriate command to the recording instrument which is ready to make the recording. Furthermore, it is already known to pre-programme a recording, i.e. to record without the listener or viewer directly experiencing the transmission.

With such recording instruments, it is deemed a drawback that when the listener or viewer receives a video and/or audio transmission and then, during the transmission, for example during a piece of music or during a part of a programme such as for example a news or information programme, decides that he wishes to record this transmission, can only make a recording from the time this decision is taken but not retroactively and therefore completely.

On the other hand, for technical and economic reasons it is not possible to take the precaution of recording all transmissions and then afterwards just keep a small part and erase the rest. That would require an excessive consumption of recording material, etc.

SUMMARY OF THE INVENTION

The problem on which the invention is based resides in providing a video and/or signal receiving and recording arrangement consisting of a receiver and a recording instrument with which it is possible in the event of an instant decision on the part of the user to record from an already running programme parts which had already been transmitted prior to the decision.

In the case of the arrangement according to the invention, therefore, the data signal is stored temporarily for a certain time and is made available to the recording instrument when required so that if the user decides spontaneously to record a transmission, the data signal already transmitted during this period is still available. Therefore, if during this period of time, the user makes a decision to record a transmission, then this transmission can be recorded completely.

The arrangement according to the invention comprises an interim data store, this term being understood to embrace any device or arrangement which stores audio and/or video data in digital or analogue form for a limited period of time, preferably 2 to 10 minutes and in particular 3.5 to 6.5 minutes and then, in the same sequence as that in which the recording is made, records over and erases it, feeding the consequently freed storage space for transitionless storage of the subsequently arriving signals. Examples of such storage means are recording discs or recording tapes which run in a closed loop and which possibly have associated recording, erasing and playback stations. In the case of another form of memory used according to the invention, subsequently received data pushes previously stored data through the memory so that with this example of embodiment the stored data travel through the memory. An example of such a memory is the shift register.

BRIEF DESCRIPTION OF THE DRAWINGS

FIGS. 1 and 2 schematically depict two embodiments of arrangements according to the present invention.

DETAILED DESCRIPTION OF THE PREFERRED EMBODIMENTS

In order to facilitate comprehension by the average man skilled in the art of audio and video recording equipment (video recorders) on the one hand and in the field of audio recording equipment (radio recorders) on the other, the manner in which the interim data storage means or the arrangement according to the invention functions will be described with reference to the following example:

The user of the radio recorder switches on his radio unit. This switching-on process simultaneously switches on the interim memory according to the invention. In the present case, let it be assumed that it has an audio tape of 5 minutes' duration. This audio tape passes in a closed loop, possibly in the form of a Mobius tape to achieve the desired capacity and reduce the absolute length of the tape. In the area immediately in front of the recording heads are the erase heads; preferably, a recording head is used which records over and erases recorded tape so that in this case there is no need for an erase head.

By means of the circuit with which the man skilled in the art will be familiar, the intermediate storage means always records the transmission to which the user tunes the connected radio receiver part.

In the present example, it will always be just the last preceding 5 minutes which will be stored by the interim storage means. If, then, while the transmission is running, the user hears for instance a song of which he did not or could know that it would be included in the transmission but which he would nevertheless like to record, he switches on the recording cassette in the usual way and sets it to Record, so that immediately after the commencement of this recording, the interim storage means stops. In this way, for example, the last 5 minutes are contained in the interim storage means while the subsequent part of the transmission is recorded on the inserted cassette.

The period of 5 minutes was chosen in this example because experience shows that, if a receiver is not already prepared for recording, then this is sufficient time to find a tape, insert it into the recording instrument and commence the recording. In the case of normal songs which last about 3 minutes, it would be a good idea when required only to start the inserted cassette after the song is finished in order to save on the subsequent splicing together of the two parts of the song. Having regard to the frequent song length of about 3 minutes, a storage means having the (time) storage capacity of about 3.5 minutes is required.

Preferably, the recording device is so constructed that when the tape is inserted, the tape is advanced automatically by exactly the running time which corresponds to the recording capacity of the interim storage means so that an unrecorded "leader" is formed. Then, subsequently, it is simple for the contents of the (stopped or switched off) interim storage means to be transferred to the correct location, the "leader", of the inserted tape.

In the case of the particularly preferred embodiment, when the recording is switched on, the contents of the interim storage means are transferred to the inserted tape directly and in the present case with a time offset of 5 minutes, to the conventional cassette tape.

In the manner described, it is possible to make recordings on per se conventional recording carriers (e.g. conventional recording cassettes for radio or video recorders) which were received prior to the start of the usual recording, in the present case during the 5 minute time lapse prior to the start. It will be readily appreciated that there will in the end be contained on the conventional recording carrier a part of a recording which was received before the recording with the conventional recording carrier was started.

FIG. 1 illustrates a video and/or audio signal receiving and recording arrangement 1 that has a signal receiving means 3 which receives at least one of video and audio signals, and a recording instrument 5, as well as an interim data storage means 7. The interim data storage means 7 is linked with the receiver 3 by a control line so as to be turned on together with the receiver 3 and by a recording line so as to receive recording data signals corresponding to the signals received by the signal receiver 3. The interim data storage means 7 has a storage capacity that is limited to a specific period of data signals, such as that noted above, and which, in this case, is illustrated as having a data storage disc or shift register 14 instead of an endless loop, although the particular type of data storage medium is not critical. Thus, data received from receiver 3 is continuously applied to the storage means 7 replacing the oldest data therein.

With a recording medium, such as a tape cassette 12 in the recording instrument 5, actuation of the recording instrument will result in a control signal being delivered to the interim storage device, so that the data signals stored thereon will be delivered to the recording device, just prior to being recorded over. Upon deactivation of the recording function, a timer 13 causes the turn off signal not to be processed until a time period has elapsed which corresponds to the specific period of data signals on the storage means 7, thereby accounting for the delay associated with the signals from the receiver being delayed by their passage through the data storage means 7.

An alternative arrangement 1' is shown in FIG. 2. In this arrangement, the receiving and playback device 3' delivers an output data signal directly to both a recording instrument 5' and to the interim storage device 7', which is shown in FIG. 2 as being in the form of a closed loop of magnetic tape 8 which circulates over recording heads 9 and the erase heads 10. With this arrangement, either upon loading of a recording medium, such as cassette 12, or upon activation of the recording function, a tape advance means 15 causes the recording medium to be advanced by an amount which corresponds to the capacity of the interim data storage means so as to form a leader which will be sufficiently large to accommodate the signals contained in the interim data storage 7'.

Actuation of the recording function causes further storage of signals from the receiver 3' to be discontinued while direct recording by the recording instrument 5' from the receiver is being performed. This result can be achieved such as by a control signal from the recording instrument 5' to the receiver 3' causing the output signals of the receiver 3' to be directed to the recording instrument 5' instead of the interim data storage 7' with control signal being sent to the interim data storage means 7' to place it in a standby mode, for example.

After termination of the direct recording process, the tape advance mechanism 15 can be actuated to return the tape to the proper location at the beginning of the leader section. The contents of the interim data storage 7' is then caused to be delivered to the recording instrument for recording on the leader when a control signal is sent from the recording instrument 5' to the interim storage means 7'.

Two versions of how the FIG. 2 embodiment may be used to perform a recording function will now be described followed by a fuller description of a version of a recording operation which can be performed utilizing the FIG. 1 embodiment.

VERSION I

1. By switching on the receiving unit, the interim storage memory is switched on to the channel or frequency to which the receiver is tuned.

2. By inserting the recording carrier (tape, record or the like) and starting the recording and/or (if the recording carrier is already inserted) upon the start of the recording, recording in the interim storage means is stopped and if required a brief time lag is so actuated that the recording in the interim storage means is stopped only briefly after commencement of the recording.

3. When the recording is switched off, the recording in the interim storage means remains stopped (if required, provision can be made whereby a separate command activates the interim storage means again and then, if the stored contents of the interim storage means have still not been transferred to the recording carrier, then the said contents will be lost).

4. With a separate command, the stored contents of the stopped interim storage means is subsequently transferred to the recording carrier provided and if necessary (spliced together with) the subsequent part of the transmission which is recorded on the conventional carrier.

5. Switching off the receiver cancels out the locking device on the interim storage means.

6. By switching on the receiver, the interim storage means is switched on at the frequency or on the channel to which the receiver has been set.

VERSION II

1. By switching on the receiving unit, the interim storage memory is switched on to the channel or frequency to which the receiver is tuned.

2. The "leader" described is either formed in that when the recording carrier is inserted and/or when the recording is started, the recording carrier is advanced by the capacity of the interim storage means, the resultant unrecorded "leader" corresponding in time to the stored contents of the interim storage means.

If the leader is formed when the recording carrier is inserted, then this part of Version II corresponds to step 2 in Version I.

If the leader is only formed by the "Record" signal, then the recording on the interim storage means is only terminated upon completion of tape advance and commencement of recording.

3. When the recording is switched off, also transfer to the interim storage means is stopped (for the rest, see 3, Version I).

4. Transfer of the stored contents of the stopped interim storage means to the "leader" of the recording carrier. To this end, it is possible to provide that upon switch-off of transfer to the interim storage means this latter stores a signal which so co-operates with a corresponding signal on the conventional recording carrier which is generated on this latter at the commencement of recording, that the contents of the interim storage means can be transferred and combined virtually "seamlessly" to/with the recording on(to) the conventional recording carrier, namely onto the "leader" at some later time.

5. Switching off the receiver cuts out the locking device for transfer to the interim storage means.

6. Switching on the receiver commences (switches on) transfer to the interim storage means on the frequency or channel to which the receiver has been set.

VERSION III

1. Switching on the receiver switches the interim storage means on to the frequency or channel to which the receiver has been set.

2. By inserting the recording carrier and starting the recording or (if the recording carrier is already inserted) starting the recording, the transfer via a permanent interim storage means to the recording carrier is triggered, the signals recorded on the recording carrier being delayed by the time corresponding to the storage capacity. Permanent interim storage means is a term to be understood that the storage means in this version is not switched off, transfer of the transmission to the recording carrier via the permanent interim storage means taking place continuously but delayed corresponding to the interim storage's capacity. With this version, the described interim storage means is preferred in which the stored signals travel through the storage means (e.g. shift register).

3. In actual fact, switching off the recording has the effect of switching off the transfer via the permanent interim storage means to the recording carrier, the recording carrier stopping while the interim storage means continues to run, however. The command to switch off the recording can possibly be processed after a time lag corresponding to the interim storage's capacity in order to compensate for the delay due to the delayed transfer from the interim storage means to the recording carrier and to transfer still completely to the recording carrier the contents of the interim storage means from the point in time at which the command to switch off the recording was given.

4. Later transfer of the contents of the interim storage means to the actual recording carrier is unnecessary.

5. Switching off the receiver switches off the interim storage means at the same time, possibly with the delay described under 3 above to ensure complete recording of the contents of the interim storage means at the point in time of switching off the receiver onto the recording carrier.

6. Switching on the receiver switches on the interim storage means to the frequency or channel to which the receiver is set.

Version I is the simplest, Version II is a preferred and Version III is the most preferred of the examples of the embodiment described here by way of example.

In the case of another simple embodiment of the apparatus according to the invention, the interim storage means may be a separate component unit which is connected in parallel with the recorder in the arrangement according to the invention which consists of a receiver and a recorder. In this respect, as the actual interim storage means, as described, it comprises for example an annular tape, an endless tape, a storage disc or some other storage means which is suitable according to the invention, and also a receiving station, a playback station and an erase station, possibly also in combination with one another. With regard to the circuitry, it can according to Versions I to III be coupled to per se known combinations consisting of recording and receiving apparatus.

Preferred however are the stations provided on per se known equipment. Thus, for instance, in the case of double cassette decks, also the stations of the cassette deck which is not provided for direct recording are suitable.

Even though the arrangement according to the invention is preferably described with reference to a radio cassette recorder, the teaching according to the invention is also valid for a man skilled in the field of video recorders so that it is made possible here by the same principle according to the invention, during a television transmission, to keep in store that which has just been shown, on a conventional video cassette, although the cassette for the recording may still not have been inserted and/or started.

The teaching according to the invention is interesting also for audio tape recorders and video cameras in which recordings have to be made of events where it is not exactly determined when they will start. The recording instruments or video cameras which are provided with the interim storage means according to the invention can be held ready for recording without the actual recording being made and can then be switched on by command of the user after the event has started. The commencement of the event is then, according to the version I and II, to be found in the interim storage means which was stopped after the commencement of the actual recording or, according to Version III, it may be retroactively transferred to the recording carrier. This solution may lead to thoroughly fascinating results not only in the case of natural science recordings but also in connection with sport or news reports. It does also considerably reduce the consumption of recording tapes.

The teaching according to the invention can be applied in various ways by the average man skilled in the art: in a preferred embodiment, the interim storage means according to the invention can, in order to resolve the problem on which the invention is based, be integrated into the recording instrument or into the receiving instrument so that it becomes possible to obtain commercially for example such a radio recorder, such a video recorder, such a television receiver, such a tape recorder or such a video camera. It is however also conceivable that the described interim storage means, adapted to the task and the solution according to the invention, may be constructed as a separate component either as a module or as a separate device. Accordingly, the protection of the patent to be granted should extend also to these embodiments of the invention.

I claim:

1. A signal receiving and recording arrangement consisting of a broadcast signal receiver means for receiving at least one of broadcast video and audio signals and a recording instrument with
    an interim data storage means for storing data signals which correspond to the broadcast signals received by the broadcast signal receiver means, said interim data storage means being connected so as to be switched on whenever the signal receiver means is switched on, and having a storage capacity that is limited to a specific period of said data signals and which cyclically stores said data signals for the specified period, and
    an access and connecting device that is connected to the interim data storage means and the recording instrument and which enables the data signals stored in the interim data storage means to be transferred from the interim data storage means to the recording instrument in response to operation of the recording instrument by a user;
    wherein said access and connecting device is operable for commencing the transferring of said data signals stored in the interim data storage means from the interim data storage means to the recording instrument immediately upon said operation of the recording instrument by a user, and for delaying termination of said transference of the data signals, after deactivation of said recording instrument by the user, for a period of time corresponding to the storage capacity of said interim data storage means.

2. An arrangement according to claim 1, wherein the access and connecting device includes means for transferring to the recording instrument, when the recording instrument is in operation, data signals stored in the interim data storage means as well as data signals subsequently received by the broadcast signal receiver means after an intermediate storage thereof in the interim data storage means.

3. An arrangement according to claim 2, wherein the interim data storage means is a memory having a means for releasing the oldest of said data signals as new data signals are received when the storage capacity of the memory is exceeded.

4. An arrangement according to claim 2, wherein the specific period to which the capacity of the interim data storage means is limited corresponds to a recording time of 2 to 10 minutes.

5. An arrangement according to claim 1, wherein the interim data storage means is selected from the group consisting of an annular loop of a strip-like data carrier and a storage disc.

6. An arrangement according to claim 5, wherein the specific period to which the capacity of the interim data storage means is limited corresponds to a recording time of 2 to 10 minutes.

7. An arrangement according to claim 1, wherein the interim data storage means is a memory having a means for releasing the oldest of said data signals as new data signals are received when the storage capacity of the memory is exceeded.

8. An arrangement according to claim 1, wherein the broadcast signal receiver means is a radio receiver and the recording instrument is a cassette recorder.

9. An arrangement according to claim 1, wherein the broadcast signal receiver means is a television receiver and the recording instrument is a video recorder.

10. An arrangement according to claim 1, wherein the specific period to which the capacity of the interim data storage means is limited corresponds to a recording time of 2 to 10 minutes.

11. An arrangement according to claim 1, wherein the signal receiver means is a radio receiver and the recording instrument is a cassette recorder.

12. An arrangement according to claim 1, wherein the broadcast signal receiver means is a television receiver and the recording instrument is a video recorder.

13. An arrangement according to claim 1, wherein the specific period to which the capacity of the interim data storage means is limited corresponds to a recording time of 2 to 10 minutes.

14. An arrangement according to claim 1, further comprising an output means for producing a respective one of a visual and an audio output from said broadcast signal receiver means; and
    user operable actuating means for commencing transference of the data signals stored in said interim data storage to the recording instrument for recording thereof and for terminating said transference of the data signals;
    wherein production of said output signals by said output means is unaffected by operation of said user operable means.

* * * * *